United States Patent
Zhu et al.

(10) Patent No.: US 7,610,456 B2
(45) Date of Patent: Oct. 27, 2009

(54) AUTOMATICALLY DETECTING TYPES OF EXTERNAL DATA FLASH DEVICES

(75) Inventors: Xiaogang Zhu, Fremont, CA (US); Jonathan F. Lee, Dublin, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 11/945,128

(22) Filed: Nov. 26, 2007

(65) Prior Publication Data

US 2008/0071979 A1 Mar. 20, 2008

Related U.S. Application Data

(63) Continuation of application No. 11/181,547, filed on Jul. 14, 2005, now Pat. No. 7,305,528.

(51) Int. Cl.
*G06F 12/00* (2006.01)
(52) U.S. Cl. .................. 711/156; 711/103; 711/115; 711/154
(58) Field of Classification Search .................. None
See application file for complete search history.

(56) References Cited

U.S. PATENT DOCUMENTS 7,281,082 B1 * 10/2007 Knapp .................. 711/103

| | | | | |
|---|---|---|---|---|
| 2002/0016893 A1 * | 2/2002 | Asauchi | ................ | 711/154 |
| 2004/0148482 A1 * | 7/2004 | Grundy et al. | ............. | 711/167 |
| 2004/0210707 A1 * | 10/2004 | Ohara et al. | ............... | 711/103 |
| 2005/0039085 A1 * | 2/2005 | Takeda et al. | ................ | 714/57 |
| 2005/0278478 A1 * | 12/2005 | Takeda et al. | ............... | 711/101 |
| 2007/0016736 A1 * | 1/2007 | Takeda et al. | ............... | 711/156 |

* cited by examiner

*Primary Examiner*—Jack A Lane
(74) *Attorney, Agent, or Firm*—McAndrews, Held & Malloy, Ltd.

(57) ABSTRACT

Methods for identifying devices may include receiving by one or more memory devices, one or more of a plurality of read memory device ID commands. The one or more memory devices may respond to the received one or more of the plurality of read memory device ID commands. The response may include identification information corresponding to the one or more memory devices. The one or more of a plurality of read memory device ID commands may correspond to one or more of a plurality of supported memory devices. At least one access protocol may be utilizing for performing reading, erasing, and/or writing to the one or more memory devices, if the response identifies the one or more memory devices as one of the one or more of the plurality of supported memory devices.

33 Claims, 6 Drawing Sheets

US 7,610,456 B2

AUTOMATICALLY DETECTING TYPES OF EXTERNAL DATA FLASH DEVICES

CROSS-REFERENCE TO RELATED APPLICATIONS/INCORPORATION BY REFERENCE

This application is a continuation of U.S. patent application Ser. No. 11/181,547 filed on Jul. 14, 2005.

FIELD OF THE INVENTION

Certain embodiments of the invention relate to memory devices. More specifically, certain embodiments of the invention relate to automatically detecting types of external data FLASH devices.

BACKGROUND OF THE INVENTION

In some conventional electronic systems, a processor may be used for processing software and/or firmware instructions. The term "software" may refer to executable code stored in memory or hardware. As the cost of processors and memory decreases, software is used more prevalently to give flexibility to operation of many products. Along with the modern personal computers, cell phones, and various electronic devices that are controlled via software, products that have been around for many decades are being redesigned and controlled via software. Some of these products may include sewing machines, cars, and exercise machines.

A software controlled sewing machine may have many more stitching patterns available than a mechanical or electrical sewing machine. Modern cars have many functions that are software controlled. For example, software processing may be involved in allotting a correct amount of gas for each cylinder at a correct time, for shifting in automatic transmissions, for anti-lock braking systems, and for detecting that seatbelts are not fastened. Exercise machines such as treadmills may have software that controls speed, degree of incline as when simulating running uphill, calculations on calories used based on distance, speed, and weight of the runner, and history of the runner's progress over a period of time.

The software, however, needs to be stored in memory where it is accessible to the processor. In some instances, the processor may have to determine the characteristics of the memory device in order to access the information, such as software, that may be stored on the memory device. For example, the processor may need to know whether access to the memory device data is serial or parallel, what timing considerations are needed in reading information from the memory device, and how large the memory device is. These characteristics are usually fixed at a design phase of a product. However, some products may be designed more flexibly so that information about the memory device may be fixed during manufacturing of the product. For example, two widespread methods are using jumpers and pins or printed circuit (PC) board connections to indicate the type of memory used on the board. Each pair of pins, which may or may not be shorted by a jumper, may indicate logic zero or logic one. Similarly, PC traces may be cut or left intact to indicate logic zero or logic one.

FIG. 1 is a block diagram illustrating pins and jumper circuitry that may be utilized to give flexibility to an electronic circuit. Referring to FIG. 1, there is shown four pairs of pins, 100 and 101, 102 and 103, 104 and 105, and 106 and 107, a jumper 110, a resistor pack 120 and an integrated circuit (IC) 130. Each of the pins 100, 102, 104 and 106 may be connected to ground $V_{ss}$, and each of the corresponding pins 101, 103, 105, and 107 may be connected to a first terminal of its respective pull-up resistor in the resistor pack 120. The second terminals of the pull-up resistors in the resistor pack 120 may be connected to a high voltage potential $V_{dd}$ of a power supply. Each of the pins 101, 103, 105 and 107 may also be connected to an input of the IC 130. The jumper 110 may be constructed so as to be able to be placed on a pair of pins, for example, the pins 100 and 101. When placed on a pair of pins, the jumper 110 may short-circuit the pins using the short-circuit bar 112.

In general, each pin that is connected to a pull-up resistor may indicate a high state, or logic one, to an IC to which it may also be connected. However, if a jumper short-circuits a pin that is pulled up to $V_{dd}$ to its respective pin that is connected to the ground $V_{ss}$, that pin may indicate a low state, or logic zero, to the IC to which it may be connected. In this manner, by placing jumpers appropriately on pairs of pins, a specific binary value may be communicated to the IC. The IC may then use the binary value as an input in determining what steps may need to be taken. For example, the binary value may indicate the speed at which memory must be accessed. Or, the binary value may indicate the type of memory that is available. Or, the binary value may indicate which vendor's FLASH memory is being used on the present circuit.

In operation, the pin 101 may be connected to a first pull-up resistor in the resistor pack 120 and to the input IN1 of the IC 130. The pin 103 may be connected to a second pull-up resistor in the resistor pack 120 and to the pin IN2 of the IC 130. The pin 105 may be connected to a third pull-up resistor in the resistor pack 120 and to the pin IN3 of the IC 130. The pin 107 may be connected to a fourth pull-up resistor in the resistor pack 120 and to the pin IN4 of the IC 130. A jumper 110 may be placed on the pin 101 and its corresponding pin 100. Hence, the voltage at the pin 101 and the corresponding input IN1 at the IC 130 may be at the voltage level of the ground $V_{ss}$. Because the pin 101 is at the voltage level of the ground $V_{ss}$, there is a voltage drop across the pull-up resistor to which the pin 101 is connected. There is, then, a current flow through that pull-up resistor that may depend on the resistance value of the pull-up resistor.

The voltages at the pins 103, 105 and 107 and the corresponding inputs IN2, IN3, and IN4 at the IC 130 may be at the high potential $V_{dd}$. If the input IN1 is the least significant bit, and the input IN4 is the most significant bit, then the binary value indicated by the pins and the jumper may be 1110. Any binary value from 0000 to 1111 may be indicated by appropriately placing or removing jumpers on the pairs of pins 100 and 101, 102 and 103, 104 and 105, and 106 and 107.

FIG. 2 is a block diagram illustrating printed circuit board traces that may be utilized to give flexibility to an electronic circuit. Referring to FIG. 2, there is shown pads 200 and 201, 202 and 203, 204 and 205, and 206 and 207. There is also shown an uncut trace 210 between the pads 200 and 201, a resistor pack 220 and an IC 230. Each of the pads 201, 203, 205 and 207 may be connected to respective first terminals of the pull-up resistors in the resistor pack 220. The second terminals of the pull-up resistors in the resistor pack 220 may be connected to the high voltage $V_{dd}$ of the power supply. The pads 201, 203, 205, and 207 may also be connected to inputs IN1, IN2, IN3, and IN4, respectively, of the IC 230.

In operation, an uncut trace, for example, the trace 210, may pull the voltage of a pad, for example, the pad 201, to the voltage level of the ground $V_{ss}$. A trace may be cut between two pads, for example, as cut between the pads 102 and 103, 104 and 105, and 106 and 107. The pads 103, 105 and 107 may then be pulled up to a high voltage level $V_{dd}$. Therefore, if the input IN1 is the least significant bit and the input IN4 is the most significant bit, the binary value indicated by the pads may be 1110. Any binary value from 0000 to 1111 may be indicated by appropriately cutting traces appropriately between pairs of pads. Any pair of pads that has an uncut trace between them may conduct current that may depend on the resistance of the pull-up resistor connected to one of the pair of pads.

Although either a pins and jumper method or pads and trace method may be used to allow system flexibility at or after manufacturing, since a PC trace that is cut may be hard to reconnect, the jumpers and pins approach is usually preferred. To change configurations, jumpers may simply be removed from a pair of pins, or placed on a pair of pins. The advantage of the pads and trace method is that no additional parts are required.

One or more pairs of pins may represent a plurality of binary bits, and an IC may be adapted to read the values indicated by the jumpers and pins. Each binary value may indicate a specific type of, for example, memory device. One reason for allowing a plurality of memory devices may be that various vendors may supply suitable memory devices for the product, but some devices may have slightly different characteristics than other memory devices. For example, the read cycles may have different timing characteristics, or write times may have different timing characteristics. By allowing the flexibility to use different memory devices, the product manufacturer may be able to use a wider variety of memory devices. For example, the product manufacturer may have a circuit board that is designed to accept memory devices A, B or C. Memory devices A and B may be unavailable due to back-order, and therefore the product manufacturer may be use memory device C. Another reason is that there may be a need for a larger memory device in the future as the product evolves. Accordingly, smaller memory devices, which may be cheaper than the larger devices, may be used until the need for the larger memory device presents itself.

However, there are several problems with these methods. One problem is that the number of different memory devices is limited by the initial number of jumpers or PC traces designed for the product. For example, if there are two jumpers that are allocated for the memory device identification purpose, only four different devices may now be recognized. If additional memory devices are developed that can also be used for the present product, the pins and jumper method or the pads and PC trace method may not be able to support it. In order to facilitate the use of the new memory devices, the PC board layout may be required at additional cost. There may also be the manufacturing set-up cost related to changes that may have to be made for the assembly line. Alternatively, one of the memory devices that may be supported may be replaced with the new product. But this may not be an ideal situation if the no-longer-supported memory device is still a viable part for the product.

A second problem is that for each jumper or trace on the PC board, an input pin on an IC needs to be dedicated to it. Therefore, not only is there cost because of the additional PC board space needed for the jumpers, but there is also the layout cost because of the pull-up resistor and the traces from the pins to the pull-up resistors and to the IC that reads the binary values indicated by the jumpers and the pins. Furthermore, there may be significant cost associated with each additional input pin for the IC if the pin count on the IC package needs to be increased to the next IC package size.

Another problem with the two methods is power dissipated when each method is configured to indicate a low voltage. For example, in a typical configuration, in order to have a pair of pins, or a pair of pads, indicate logic zero, the pin or pad connected to the pull-up resistor may be connected to ground. Therefore, the voltage at the input pin of the IC that reads the value of the pair of pins is low, which indicates logic zero. But, when a pull-up resistor is connected to ground, there is a current flow to ground, and this changes power requirements of the system.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for automatically detecting types of external data FLASH devices, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for automatically detecting types of external data FLASH devices. Aspects of the method may comprise communicating at least one of a plurality of read memory device ID commands corresponding to at least one of a plurality of supported memory devices to at least one memory device. Data received in response to this communication may be utilized to determine whether the received data identifies the memory device as one of the plurality of supported memory devices. The supported memory devices may be FLASH memory devices, which may be serial FLASH memory devices. Each of the plurality of read memory device ID commands may be manufacturer specific, or may be specific to a group of the supported memory devices. The communicating of read memory device ID commands and determining whether the memory device is one of the supported memory devices may be repeated if the memory device is not identified as one of the supported memory devices. The number of times this is repeated may be limited.

Figure 1:
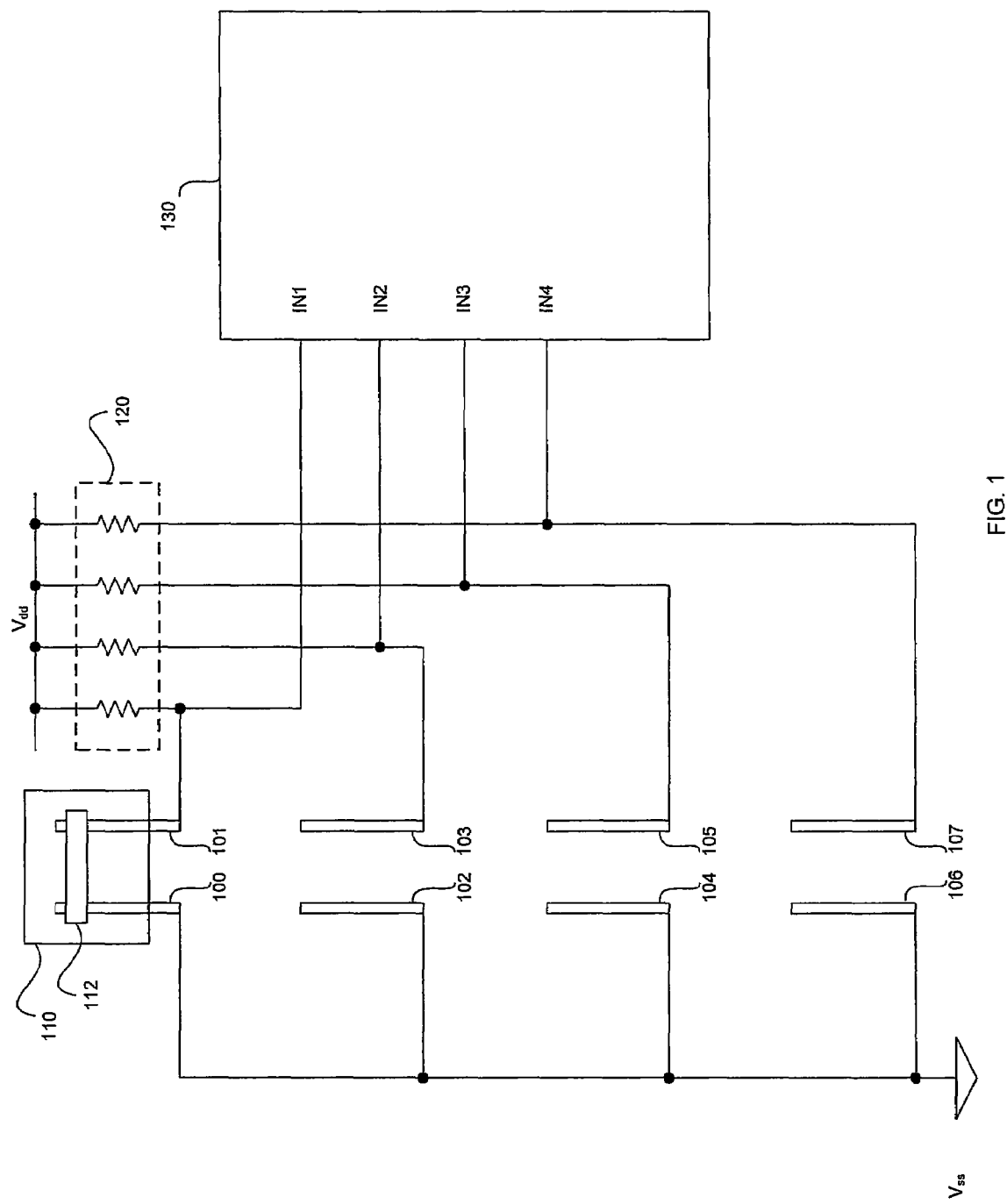
FIG. 1 is a block diagram illustrating pins and jumper circuitry that may be utilized to give flexibility to an electronic circuit.
Figure 2:
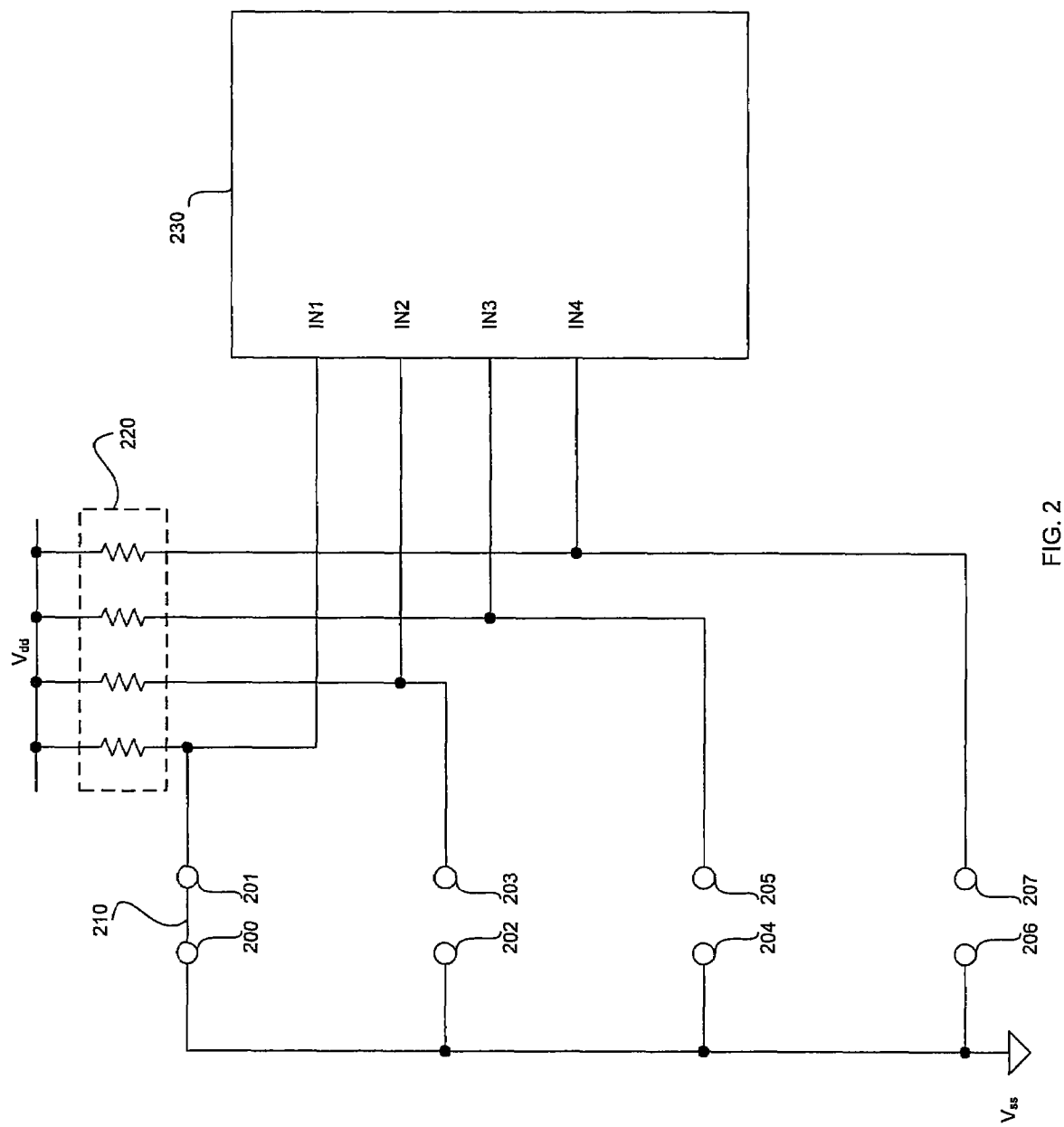
FIG. 2 is a block diagram illustrating printed circuit board traces that may be utilized to give flexibility to an electronic circuit.
Figure 3:
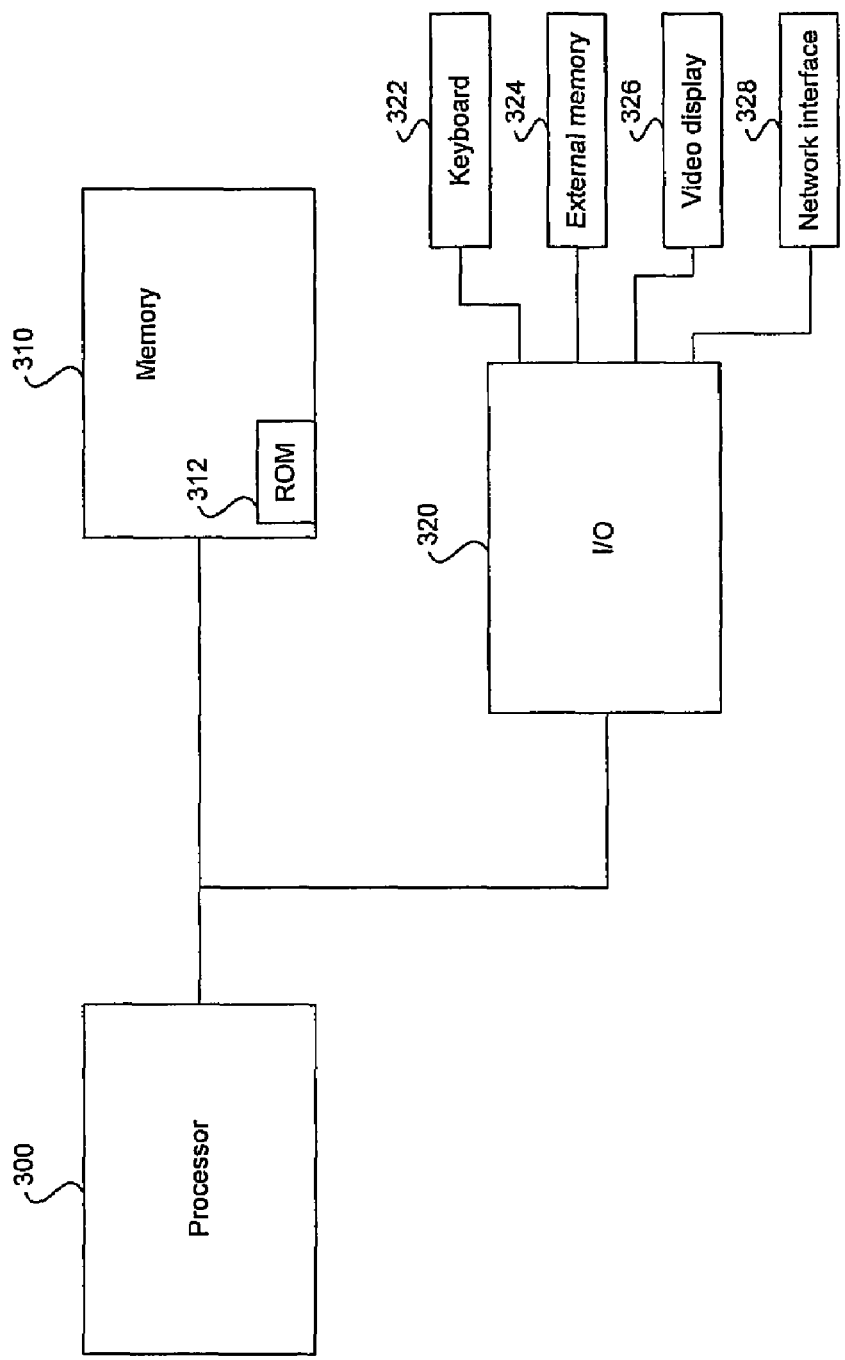
FIG. 3 is a block diagram of an exemplary system with a processor and memory that may be utilized in connection with an embodiment of the invention.

FIG. 3 is a block diagram of an exemplary system with a processor and memory that may be utilized in connection with an embodiment of the invention. Referring to FIG. 3, there is shown a processor 300, a memory block 310, and input/output (I/O) block 320. The memory block 310 may comprise a read-only memory (ROM) 312. There is also shown a keyboard 322, an external memory device 324, a video display terminal 326, and a network interface 328 that may interface with the I/O block 320.

In operation, the processor 300 may read instructions from the memory block 310 in order to execute the instructions. The interface between the processor 300 and the memory block 310 may have parameters that are fixed at the design stage. For example, some parameters may indicate whether the access is parallel or serial, the width of the data bus, the width of the address bus, and the access times for the memory block 310. The memory block may comprise several types of memory. For example, an initial boot code may be in the ROM 312. The code in the ROM 312 may be executed to set up the processor 300 so that it may be able to communicate to the rest of the memory block 310 and/or I/O block 320. An instruction pointer in the processor 300 may then be set to point to another address in the memory block 310. This may allow the initial boot code to be constant for a processor, while the personality of a product may be changed by modifying the contents of the rest of the memory block 310.

The processor 300 may also access the I/O block 320 to receive input, for example, from a keyboard 322 or from an external memory device 324. Additionally, the processor 300 may access the I/O block 320 to display data, for example, on a video display terminal 326, or to store data, for example, on the external memory device 324. The I/O block 320 may also comprise a network interface 238 to an external network, for example, a wireless home network or Internet. The processor 300 may execute instructions that may allow data to be transferred to and from remote devices via the external network.

Figure 4:
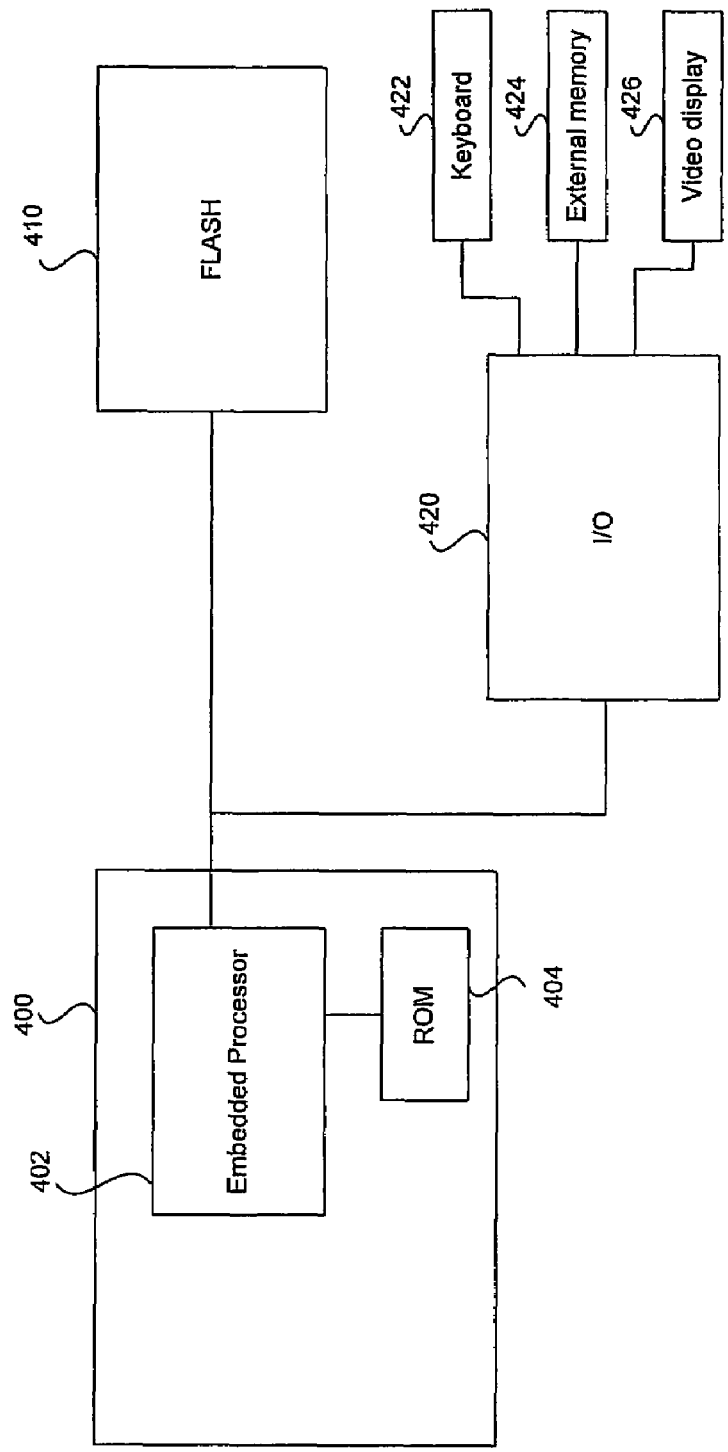
FIG. 4 is a block diagram of an exemplary system with an embedded processor and a FLASH memory device, in accordance with an embodiment of the invention.

FIG. 4 is a block diagram of an exemplary system with an embedded processor and a FLASH memory device, in accordance with an embodiment of the invention. Referring to FIG. 4, there is shown an integrated circuit (IC) 400, a FLASH memory device 410, and an I/O block 420. The IC 400 may comprise an embedded processor 402 and a ROM 404. There is also shown a keyboard, or a keypad, 422, an external memory 424, and a video display 426.

In operation, upon power-up reset, the processor, which may be an embedded processor 402, may fetch instructions and/or data from the ROM 404. The interface to the ROM 404 may be designed so that the default access cycle, which may be the slowest access cycle, of the embedded processor 402 may be utilized to access data in the ROM 404. The embedded processor 402 may execute the fetched instructions in order to configure the embedded processor 402 so that the embedded processor 402 may function in a desired manner. For example, if applicable, access speeds of the embedded processor 402 may be set up for various addresses, where different addresses may access physically different devices. Some addresses may refer to different memory devices, some addresses may refer to different I/O devices, and the different devices may have different access protocols. For example, the read time for the ROM 404 may be faster than the read time from the FLASH memory device 410 and the read time for the keyboard 422. In this regard, the access cycle timing to the ROM 404 may be modified to be able to read from the ROM 404 faster than for either the FLASH memory device 410 or the keyboard 422. After the required instructions from the ROM 404 have been executed, the embedded processor's instruction pointer may be set to point to the address of the FLASH memory device 410.

The embedded processor 402 may then fetch data and/or instructions from the FLASH memory device 410. If the product for which the IC 400 and the FLASH memory device 410 are intended will not change the interface characteristics over the product lifetime, then the embedded processor 402 may not need to determine what type of FLASH memory device is being used. However, various types of FLASH memory devices may be used, for example, from different vendors, or devices that are different sizes. This may be a design and/or production decision for procurement reasons and/or to allow the product to use smaller FLASH memory devices now while allowing for bigger memory devices if needed later. If so, it may be necessary to select one of a plurality of access protocols for FLASH memory devices. The access protocol for a FLASH memory device may comprise commands to read data, to erase data, and to write data. Accordingly, the embedded processor 402 may need to read information from the FLASH memory device 410 regarding these parameters. The information read may identify the memory device, and the information for the memory device may be retrieved from memory, for example, from the ROM 404.

The embedded processor 402 may communicate a different read device ID command for different types of memory devices that are supported. The embedded processor 402 may communicate each read device ID command in turn to the FLASH memory device 410. If the FLASH memory device 410 responds correctly to one of the read device ID commands, then the type and size of the FLASH memory device 410 may be identified, and the embedded processor 402 may utilize the correct access protocol for reading instructions from the FLASH memory device 410, and erasing and/or writing to the FLASH memory device 410 as needed. If the FLASH memory device 410 does not respond to any of the read device ID commands, then the embedded processor may indicate an error condition.

Figure 5:
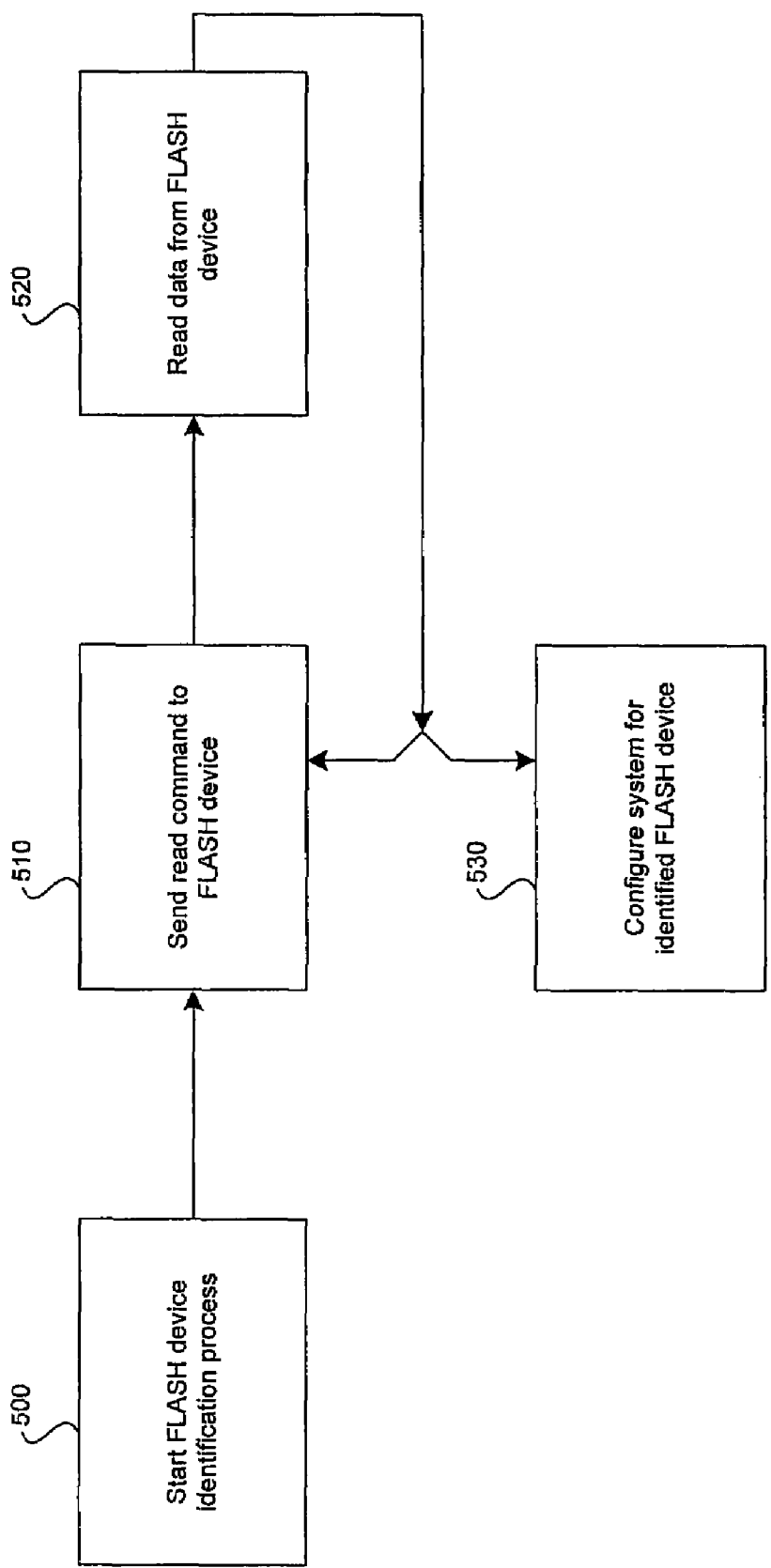
FIG. 5 illustrates an exemplary flow diagram for reading device information from FLASH memory, in accordance with an embodiment of the invention.

FIG. 5 illustrates an exemplary flow diagram for reading device information from FLASH memory, in accordance with an embodiment of the invention. Referring to FIG. 5, step 500 comprises initiating the identification process of reading device information from the FLASH memory device. Step 510 comprises sending a read memory device ID command, where the read memory device ID command is for one of several FLASH memory devices that are supported. In this regard, the step 510 may be utilized to determine whether the FLASH memory device is a supported memory device. Step 520 comprises comparing received data from the FLASH memory device to stored device ID information in order to identify the specific FLASH memory device. Step 530 comprises configuring the embedded controller to support the identified FLASH memory device.

Referring to FIGS. 4 and 5, the steps 500 to 530 may be utilized to detect types of FLASH devices. In step 500, a processor, for example, the embedded processor 402, may initiate the identification process. This may comprise sending the read memory device ID command to the FLASH memory device and determining whether the FLASH memory device is a supported memory device. This may be done after power-up reset. The embedded processor 402 may fetch the bootstrap code from a local ROM, for example, the ROM 404. The code fetched from the ROM 404 may comprise read instructions for a plurality of FLASH memory devices that may be supported.

In step 510, the embedded processor 402 may send one of a plurality of read device ID commands to the FLASH memory 410. Each read device ID command may be specific to a FLASH memory device or to a group of FLASH memory devices. The embedded processor 402 may send successive read device ID commands to the FLASH memory 410 if the data read from the FLASH memory 410 does not match information for supported FLASH memory devices.

In step 520, the embedded processor 402 may read the data from the FLASH memory 410. This data may be compared to information regarding FLASH memory devices that may be supported. For example, the data may comprise the manufacturer, the device type, and the device size. If the data indicates that the FLASH memory 410 is a supported device, the next step may be step 530 where the system may be configured to use the identified FLASH memory 410. Alternatively, the data read from the FLASH memory 410 may not indicate that it is a supported FLASH memory device.

There may be several reasons for this. For example, the FLASH memory 410 may have recognized the read memory device ID command, and therefore output data in response to the read memory device ID command. However, the specific type of FLASH memory 410 may not be supported. Another reason may be that the FLASH memory 410 may not recognize the read memory device ID command, and, therefore, does not output data. Accordingly, the data bus may not be driven by the FLASH memory 410 or the embedded processor 402, and may be floating. Therefore, the data read by the embedded processor 402 may be voltage level on a bus that is floating. In either case, the next step may be step 510, where a different read memory device ID command may be sent to the FLASH memory 410. If all of the plurality of read memory device ID commands have been sent without determining whether the FLASH memory 410 is a supported FLASH memory device, the embedded processor 402 may indicate a system failure in a manner that may be design dependent.

In step 530, the embedded processor 402 may be configured to read and/or write to the FLASH memory 410. For example, the embedded processor 402 may need to use device specific commands to read data, erase data on the FLASH memory 410 or to write data to the FLASH memory 410. Furthermore, the FLASH memory 410 access, whether reading or writing, may be for a single byte or for multiple bytes. Erasing and writing may require specific commands that may indicate discretely sized blocks of memory to be operated upon.

Figure 6:
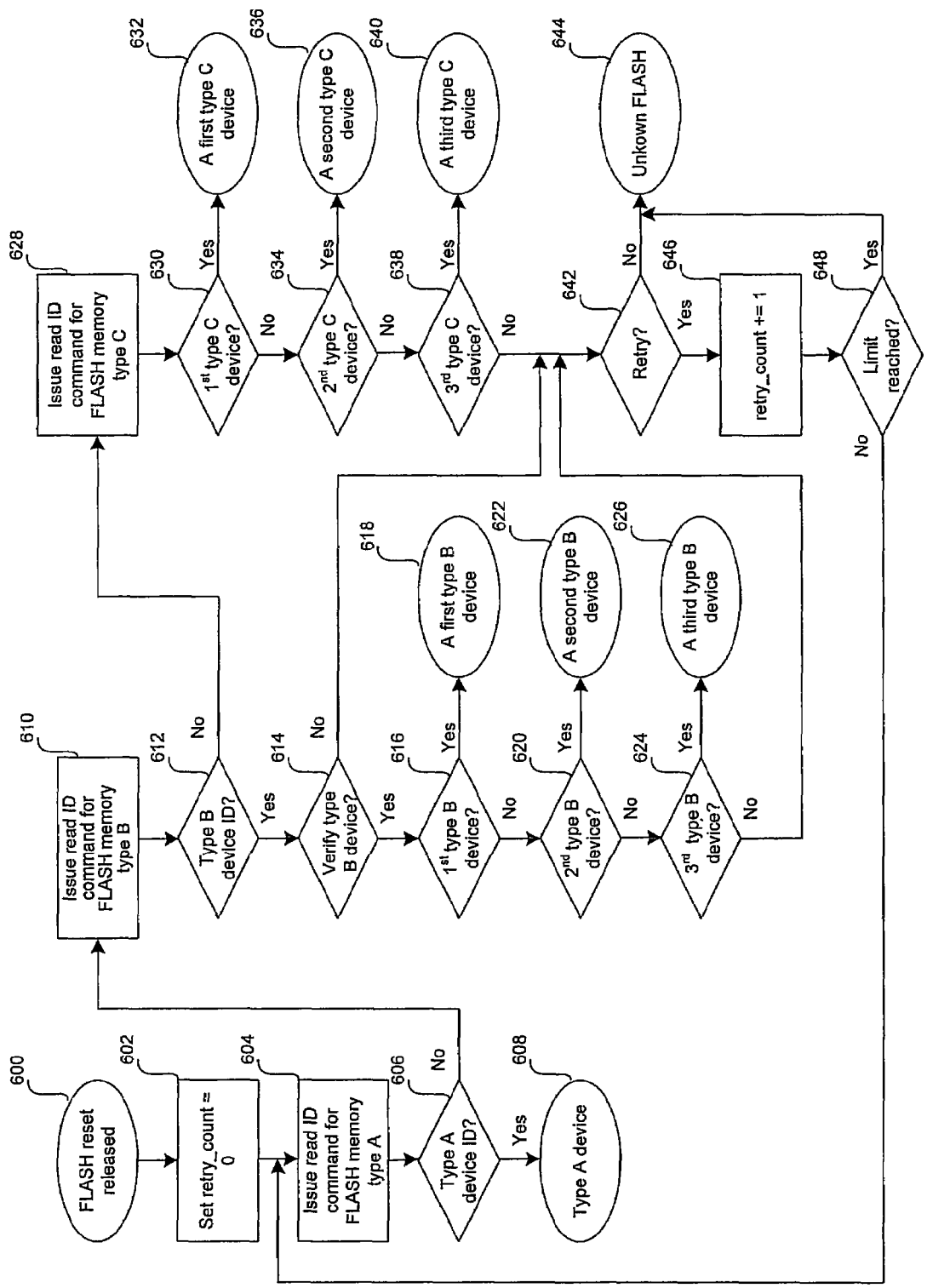
FIG. 6 illustrates an exemplary flow diagram for identifying specific FLASH memory, in accordance with an embodiment of the invention.

FIG. 6 illustrates an exemplary flow diagram for identifying specific FLASH memory, in accordance with an embodiment of the invention. Referring to FIG. 6, steps 600 to 648 may be utilized to detect specific types of FLASH devices, where the devices may be of type A, type B, or type C. In step 600, the FLASH memory device identification process may begin when reset of the embedded processor and the FLASH memory 410 is complete. In step 602, a variable, for example, retry_count, may be reset to zero. This variable may keep a count of the number of iterations by the embedded processor 402 in trying to identify the FLASH memory 410.

In step 604, the embedded processor may issue a read device ID command for a FLASH memory type A. In step 606, the embedded processor 402 may read the data output by the FLASH memory 410. If the data read indicates that the FLASH memory 410 may be the FLASH memory type A, the next step may be step 608 where the embedded processor 402 may continue based on the determination of the type of the FLASH memory 410. If the data read does not indicate that this FLASH memory device is the FLASH memory type A, the next step may be step 610.

In step 610, the embedded processor 402 may send a read device ID command for FLASH memory type B devices. In step 612, the embedded processor 402 may read the data output by the FLASH memory 410. If the data read indicates that the FLASH memory 410 is not the FLASH memory type B device, the next step may be step 628. However, if the data read indicates that the FLASH memory 410 is the FLASH memory type B device, the data may be further checked to see if it is one of the supported FLASH memory type B devices. If the data does not indicate that this is one of the supported FLASH memory type B devices, the next step may be step 642. However, if the data does indicate that this is one of the supported FLASH memory type B devices, the next step may be step 616.

In step 616, the data may be checked to see if it indicates a first supported FLASH memory type B device. If it is, then the next step may be step 618. In step 618, the embedded processor 402 may continue based on the determination of the type of the FLASH memory 410. If the data does not indicate that this is the first supported type B device, the next step may be step 620. In step 620, the data may be checked to see if indicates a second supported FLASH memory type B device. If it is, the next step may be step 622. In step 622, the embedded processor 402 may continue based on the determination of the type of the FLASH memory 410. If the data does not indicate a second supported FLASH memory type B device, the next step may be step 624. If the data indicates that this FLASH memory device is a third of the FLASH memory type B devices that may be supported, the next step may be step 626. In step 626, the embedded processor 402 may continue based on the determination of the type of the FLASH memory 410. If the data indicates that this is not the third supported FLASH memory type B device, the next step may be step 642.

If, in step 612, the first byte read indicates that the manufacturer of the FLASH memory device is not the manufacturer of the FLASH memory type B devices, then the next step may be step 628. In step 628, the embedded processor 402 may send a read device ID command for FLASH memory type C devices. In step 630, if the data from the FLASH memory 410 indicates that this FLASH memory device may be a first supported FLASH memory type C device, the next step may be step 632. In step 632, the embedded processor 402 may continue based on the determination of the type of the FLASH memory. If the data does not indicate that this a first supported FLASH memory type C device, the next step may be step 634 where the data may be checked to see if it indicates that this FLASH memory device may be a second supported FLASH memory type C device. If so, the next step may be step 636 where the embedded processor 402 may continue based on the determination of the type of the FLASH memory 410.

If not, the next step may be step 638 where the data may be checked to see if it indicates that this FLASH memory device may be a third supported FLASH memory type C device. If so, then the next step may be step 640 where the embedded processor 402 may continue based on the determination of the type of the FLASH memory 410. If not, the next step may be step 642 where the embedded processor 402 may determine whether the process of trying to identify the FLASH memory 410 should be repeated. This decision may be design and/or implementation dependent, and may be based on, for example, the number of times of trying to identify the FLASH memory 410. If the decision is end trying, then the next step may be step 644 where failure in trying to identify the FLASH memory 410 may be indicated. The specific failure indication may be design and/or implementation dependent.

However, if the decision is to continue trying to identify the FLASH memory 410, then the next step may be step 646 where the variable retry_count may be incremented by one. In step 648, the variable retry_count may be checked to see if it is larger than a threshold value for retries, which may be design and/or implementation dependent. If the variable retry_count is larger than the threshold value, then the next step may be step 644. However, if the variable retry_count is not larger than the threshold value, the next step may be step 604, and the process of trying to identify the FLASH memory 410 may be repeated.

An embodiment of the invention may have been described as identifying the memory device after a power-up reset. However, the invention need not be limited in this manner. The identification of the memory devices may also occur whenever it may be deemed necessary. For example, if the processor, for example, the embedded processor 402, cannot reliably access the memory device, the identification process may be repeated. This may occur in instances where data required for accessing the memory device may have been corrupted and may need to be refreshed or reloaded. Another example involves a scenario in which a process or an external user initiates a reset without power-cycling. This may include identifying the memory device.

Additionally, although an embodiment of the invention may have been described utilizing a processor, the invention need not be limited in this manner. For example, a logic circuit, which may include a state machine, may also be implemented to read information from the memory device. The information read from the memory device may be stored or it may be communicated to the processor. This process may take place at discrete times, for example, after a reset, and/or it may take place when the processor writes a command to the logic circuit.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for identifying devices, the method comprising:
    receiving by one or more memory devices, one or more of a plurality of read memory device ID commands; and
    responding to said received one or more of said plurality of read memory device ID commands by said one or more memory devices, wherein said response comprises identification information corresponding to said one or more memory devices and identifying one or more access protocols that are utilized to access said one or more memory devices.

2. The method according to claim 1, wherein said one or more of said plurality of read memory device ID commands corresponds to one or more of a plurality of supported memory devices.

3. The method according to claim 2, comprising determining whether said response identifies said one or more memory devices as one of said one or more of said plurality of supported memory devices.

4. The method according to claim 3, comprising utilizing at least one access protocol for performing one or more of reading from said one or more memory devices, erasing said one or more memory devices, and writing to said one or more memory devices, if said response identifies said one or more memory devices as one of said one or more of said plurality of supported memory devices.

5. The method according to claim 3, comprising indicating an error condition, if said response does not identify said one or more memory devices as one of aid one or more of said plurality of supported memory devices.

6. The method according to claim 2, comprising repeating said receiving and responding, if said one or more memory devices is not identified as one of said one or more of said plurality of supported memory devices.

7. The method according to claim 2, wherein each of said received one or more of said plurality of read memory device ID commands is specific to a group of said one or more of said plurality of supported memory devices.

8. The method according to claim 2, wherein said one or more of said plurality of supported memory devices are FLASH memory devices.

9. The method according to claim 2, wherein said one or more of said plurality of supported memory devices are serial FLASH memory devices.

10. The method according to claim 1, wherein said response identifies one or both of size and type of said one or more memory devices.

11. The method according to claim 1, wherein said received one or more of said plurality of read memory device ID commands is manufacturer specific.

12. A machine-readable storage having stored thereon, a computer program having at least one code section for identifying devices, the at least one code section being executable by a machine for causing the machine to perform steps comprising:
    receiving by one or more memory devices, one or more of a plurality of read memory device ID commands; and
    responding to said received one or more of said plurality of read memory device ID commands by said one or more memory devices, wherein said response comprises identification information corresponding to said one or more memory devices and identifying one or more access protocols that are utilized to access said one or more memory devices.

13. The machine-readable storage according to claim 12, wherein said one or more of said plurality of read memory device ID commands corresponds to one or more of a plurality of supported memory devices.

14. The machine-readable storage according to claim 13, wherein said at least one code section comprises code for determining whether said response identifies said one or more memory devices as one of said one or more of said plurality of supported memory devices.

15. The machine-readable storage according to claim 14, wherein said at least one code section comprises code for utilizing at least one access protocol for performing one or more of reading from said one or more memory devices, erasing said one or more memory devices, and writing to said one or more memory devices, if said response identifies said one or more memory devices as one of said one or more of said plurality of supported memory devices.

16. The machine-readable storage according to claim 14, wherein said at least one code section comprises code for indicating an error condition, if said response does not identify said one or more memory devices as one of said one or more of said plurality of supported memory devices.

17. The machine-readable storage according to claim 13, wherein said at least one code section comprises code for repeating said receiving and responding, if said one or more memory devices is not identified as one of said one or more of said plurality of supported memory devices.

18. The machine-readable storage according to claim 13, wherein each of said received one or more of said plurality of read memory device ID commands is specific to a group of said one or more of said plurality of supported memory devices.

19. The machine-readable storage according to claim 13, wherein said one or more of said plurality of supported memory devices are FLASH memory devices.

20. The machine-readable storage according to claim 13, wherein said one or more of said plurality of supported memory devices are serial FLASH memory devices.

21. The machine-readable storage according to claim 12, wherein said response identifies one or both of size and type of said one or more memory devices.

22. The machine-readable storage according to claim 12, wherein said received one or more of said plurality of read memory device ID commands is manufacturer specific.

23. A system for identifying devices, the system comprising:
one or more memory devices that receive one or more of a plurality of read memory device ID commands from at least one processor; and
said one or more memory devices respond to said received one or more of said plurality of read memory device ID commands, wherein said response comprises identification information corresponding to said one or more memory devices and identifying one or more access protocols that are utilized to access said one or more memory devices.

24. The system according to claim 23, wherein said one or more of said plurality of read memory device ID commands corresponds to one or more of a plurality of supported memory devices.

25. The system according to claim 24, wherein said at least one processor determines whether said response identifies said one or more memory devices as one of said one or more of said plurality of supported memory devices.

26. The system according to claim 25, wherein said at least one processor utilizes at least one access protocol for performing one or more of reading from said one or more memory devices, erasing said one or more memory devices, and writing to said one or more memory devices, if said response identifies said one or more memory devices as one of said one or more of said plurality of supported memory devices.

27. The system according to claim 25, wherein said at least one processor indicates an error condition, if said response does not identify said one or more memory devices as one of said one or more of said plurality of supported memory devices.

28. The system according to claim 24, wherein said one or more memory devices repeat said receiving and responding, if said one or more memory devices is not identified as one of said one or more of said plurality of supported memory devices.

29. The system according to claim 24, wherein each of said received one or more of said plurality of read memory device ID commands is specific to a group of said one or more of said plurality of supported memory devices.

30. The system according to claim 24, wherein said one or more of said plurality of supported memory devices are FLASH memory devices.

31. The system according to claim 24, wherein said one or more of said plurality of supported memory devices are serial FLASH memory devices.

32. The system according to claim 23, wherein said response identifies one or both of size and type of said one or more memory devices.

33. The system according to claim 23, wherein said received one or more of said plurality of read memory device ID commands is manufacturer specific.

* * * * *